(12) United States Patent
Khripkov et al.

(10) Patent No.: US 11,996,629 B2
(45) Date of Patent: May 28, 2024

(54) BEAM STEERING ANTENNA STRUCTURE AND ELECTRONIC DEVICE COMPRISING SAID STRUCTURE

(71) Applicant: Huawei Technologies Co., Ltd., Shenzhen (CN)

(72) Inventors: Alexander Khripkov, Helsinki (FI); Janne Ilvonen, Helsinki (FI); Jari Kristian Van Wonterghem, Kista (SE); Ruiyuan Tian, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 515 days.

(21) Appl. No.: 17/298,397

(22) PCT Filed: Nov. 30, 2018

(86) PCT No.: PCT/EP2018/083153
§ 371 (c)(1),
(2) Date: May 28, 2021

(87) PCT Pub. No.: WO2020/108773
PCT Pub. Date: Jun. 4, 2020

(65) Prior Publication Data
US 2021/0408682 A1    Dec. 30, 2021

(51) Int. Cl.
*H01Q 3/46* (2006.01)
*H01Q 19/10* (2006.01)
*H04M 1/02* (2006.01)

(52) U.S. Cl.
CPC .............. *H01Q 3/46* (2013.01); *H01Q 19/108* (2013.01); *H04M 1/0266* (2013.01); *H04M 1/0277* (2013.01)

(58) Field of Classification Search
CPC ........ H01Q 19/10; H01Q 19/108; H01Q 3/44; H01Q 3/46; H01Q 1/243; H01Q 1/44;
(Continued)

(56) References Cited

U.S. PATENT DOCUMENTS 9,667,290 B2    5/2017 Ouyang et al.
9,905,922 B2    2/2018 Lee et al.
(Continued)

FOREIGN PATENT DOCUMENTS

CN    101652897 A    2/2010
CN    103606755 A    2/2014
(Continued)

OTHER PUBLICATIONS

Samsung, et al., "Consideration of EIRP spherical coverage requirement," R4-1711036, 3GPP TSG-RAN WG4 Meeting #84-Bis, Dubrovnik, Croatia, Oct. 9-13, 2017, 3 pages.
(Continued)

*Primary Examiner* — Jason M Crawford
(74) *Attorney, Agent, or Firm* — Conley Rose, P.C.

(57) ABSTRACT

A beam steering antenna structure comprising a printed circuit board and a conductive component, a first wall and a second wall of the printed circuit board being juxtaposed with a first surface of the conductive component, the second wall abutting and being galvanically connected to the first surface. A second surface of the conductive component extends at an angle from the first surface. A connecting surface extends between the first wall and the second wall such that a groove is formed, the groove being partially juxtaposed to the first surface. The groove comprises a first antenna array and a second antenna array transmitting or receiving, respectively, a first radiation beam and a second radiation beam having orthogonal polarizations. The second surface steers at least one of the first or second radiation beam in a direction away from or towards the connecting surface.

20 Claims, 7 Drawing Sheets

(58) Field of Classification Search
CPC ............ H01Q 9/04; H01Q 9/06; H01Q 9/065; H01Q 21/24; H01Q 21/245
See application file for complete search history.

(56) References Cited

U.S. PATENT DOCUMENTS

| | | | |
|---|---|---|---|
| 11,522,270 B2* | 12/2022 | Tehran | ................... H01Q 15/242 |
| 2010/0117916 A1 | 5/2010 | Gustafsson et al. | |
| 2012/0077504 A1 | 3/2012 | Schadler et al. | |
| 2014/0177742 A1 | 6/2014 | Maltsev et al. | |
| 2014/0320377 A1 | 10/2014 | Cheng et al. | |
| 2014/0354487 A1 | 12/2014 | Liang et al. | |
| 2016/0088131 A1 | 3/2016 | Chiu | |
| 2016/0118713 A1 | 4/2016 | Hong et al. | |
| 2016/0164186 A1 | 6/2016 | Ganchrow et al. | |
| 2016/0241317 A1 | 8/2016 | Piazzi et al. | |
| 2017/0040667 A1 | 2/2017 | Lee | |
| 2017/0047654 A1 | 2/2017 | Nilsson et al. | |
| 2017/0069958 A1* | 3/2017 | Ko | ............................ H01Q 1/38 |
| 2017/0110787 A1 | 4/2017 | Ouyang et al. | |
| 2017/0150499 A1 | 5/2017 | Kim et al. | |
| 2017/0201011 A1 | 7/2017 | Khripkov et al. | |
| 2017/0294705 A1 | 10/2017 | Khripkov et al. | |
| 2017/0309992 A1* | 10/2017 | Noori | ..................... H01Q 13/06 |
| 2018/0006770 A1 | 1/2018 | Guo et al. | |
| 2018/0026341 A1* | 1/2018 | Mow | ..................... H01Q 1/243 |
| | | | 343/702 |
| 2019/0214726 A1* | 7/2019 | Yamagajo | ............... H01Q 21/12 |
| 2020/0212584 A1* | 7/2020 | Park | ......................... H01Q 1/44 |
| 2021/0408682 A1* | 12/2021 | Khripkov | ............... H01Q 1/243 |
| 2022/0085497 A1* | 3/2022 | Khripkov | ............. H01Q 21/067 |
| 2023/0011271 A1* | 1/2023 | Lin | ........................... H01Q 1/48 |

FOREIGN PATENT DOCUMENTS

| | | |
|---|---|---|
| CN | 104603853 A | 5/2015 |
| CN | 104937853 A | 9/2015 |
| CN | 106463817 A | 2/2017 |
| CN | 106664193 A | 5/2017 |
| CN | 107251321 A | 10/2017 |
| CN | 107408448 A | 11/2017 |
| CN | 107567038 A | 1/2018 |
| CN | 108141266 A | 6/2018 |
| CN | 108886202 A | 11/2018 |
| EP | 1635162 A2 | 3/2006 |
| EP | 3166179 A1 | 5/2017 |
| WO | 2013166464 A1 | 11/2013 |
| WO | 2016109316 A1 | 7/2016 |

OTHER PUBLICATIONS

Cong Qiubo, "Spatial Array ICs Simplify Multi-Speaker Audio Field Design," EDN China, 2012, Issue 01, 3 pages (with an English abstract).

* cited by examiner

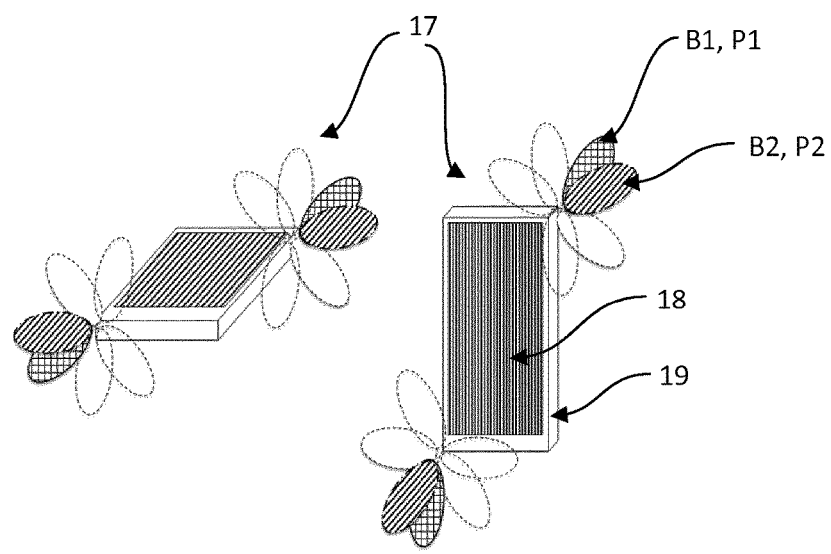
Fig. 1
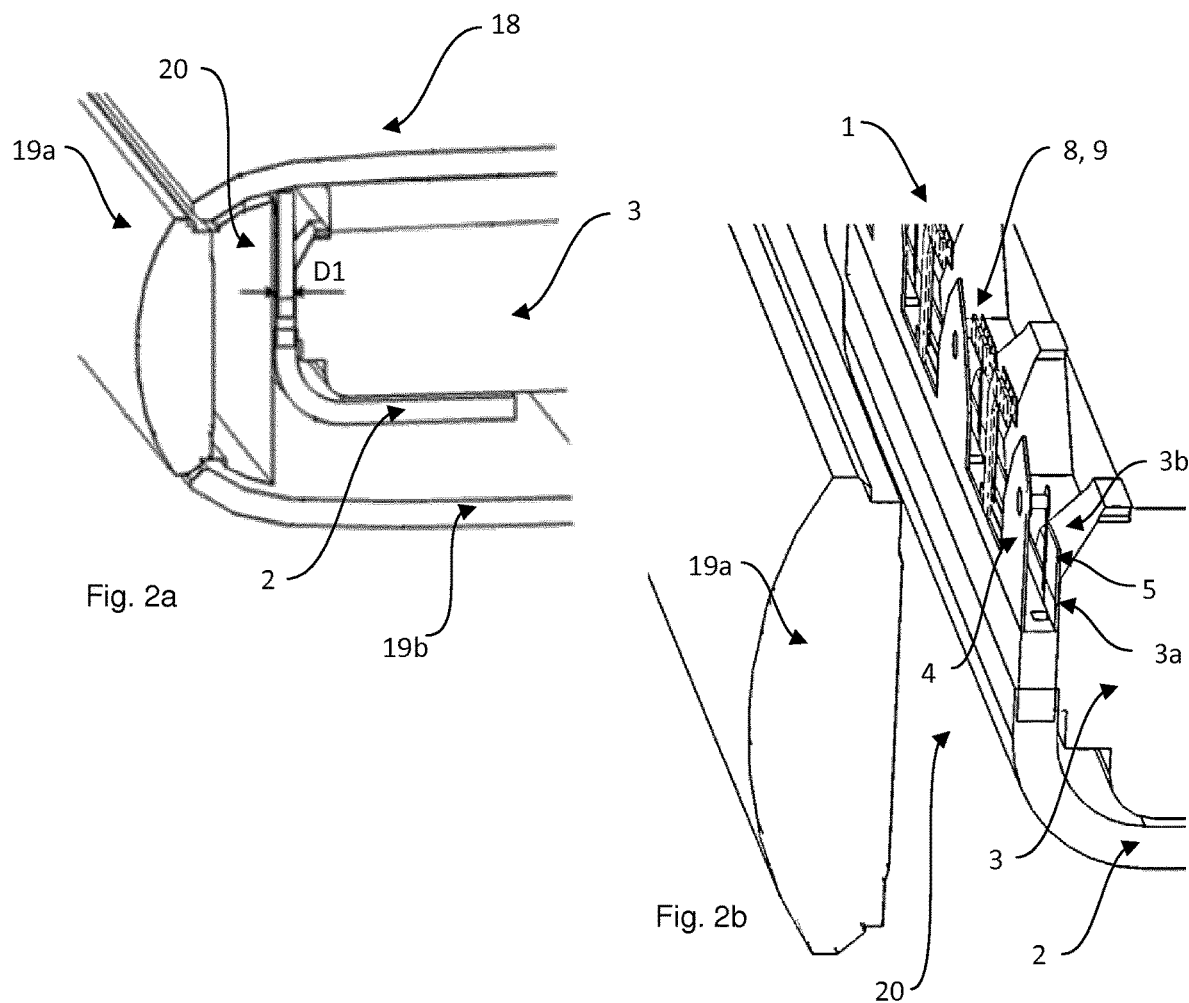
Fig. 2a
Fig. 2b

BEAM STEERING ANTENNA STRUCTURE AND ELECTRONIC DEVICE COMPRISING SAID STRUCTURE

CROSS-REFERENCE TO RELATED APPLICATIONS

This application is a U.S. National Stage of International Patent Application No. PCT/EP2018/083153 filed on Nov. 30, 2018, which is hereby incorporated by reference in its entirety.

TECHNICAL FIELD

The disclosure relates to a beam steering antenna structure comprising a printed circuit board and a conductive component, as well as an electronic device comprising a beam steering antenna structure.

BACKGROUND

Electronic devices need to support more and more radio signal technology such as 2G/3G/4G radio. For coming 5G radio technology, the frequency range will be expanded from sub-6 GHz to so called mmWave frequency, e.g. 28 GHZ and 42 GHz. For mmWave frequencies, an antenna array will be necessary in order to form a radiation beam with higher gain which overcomes the higher path loss in the propagation media. However, radiation beam patterns with higher gain result in a narrow beam width, wherefore beam steering techniques such as the phased antenna array is used to steer the beam in a specific, desired direction.

Mobile electronic devices, such as mobile phones and tablets, may however be oriented in any arbitrary direction. Therefore, such electronic devices need to exhibit an as near full spherical beam coverage as possible. Such coverage is difficult to achieve, i.a. due to the beam being blocked by a large display and/or by the hand of the user holding the device.

Conventionally, a mmWave antenna array is arranged next to the display, such that the display does not interfere with the beam coverage. However, the movement towards very large displays, covering as much as possible of the electronic device, makes the space available for the antenna array very limited, forcing either the size of the antenna array to be significantly reduced, and its performance impaired, or a large part of the display to be inactive.

SUMMARY

It is an object to provide an improved electronic device. The foregoing and other objects are achieved by the features of the independent claim. Further implementation forms are apparent from the dependent claims, the description, and the figures.

According to a first aspect, there is provided a beam steering antenna structure comprising a printed circuit board and a conductive component, a first wall and a second wall of the printed circuit board being juxtaposed with a first surface of the conductive component, the second wall of the printed circuit board abutting and being galvanically connected to the first surface of the conductive component, a second surface of the conductive component extending at an angle from the first surface of the conductive component in a direction from the first wall, a connecting surface extending between the first wall and the second wall such that a groove is formed between the first wall and the second wall, the groove being at least partially juxtaposed to the first surface, the groove comprising a first antenna array and a second antenna array, the first antenna array transmitting a first radiation beam having a first polarization in a direction towards the second surface, or receiving the first radiation beam in a direction from the second surface, the second antenna array transmitting a second radiation beam having a second polarization, orthogonal to the first polarization, in the direction towards the second surface, or receiving the second radiation beam in the direction from the second surface, the second surface steering at least one of the first radiation beam and the second radiation beam in a direction away from or towards the connecting surface.

Such a solution allows changing the direction of the main lobe of the radiation pattern of at least one of the radiation beams such that the two antenna arrays transmit or receive in the same direction. This not only allows using dual polarization but also facilitates constructive interference between the two radiation beams, leading to increased antenna performance and stable communication in all directions and orientations. The present disclosure enables dual layer polarization MIMO/diversity support of the electronic device. Furthermore, the present disclosure supports large displays, i.e. displays covering over 85% of the surface of the device. This becomes possible since the dimensions of the device surface which is occupied by the present antenna structure is reduced to $\lambda/20$, as compared to prior art, $\lambda$ being a wavelength of electromagnetic radiation. The occupied dimensions of the device surface are defined by the thickness of the printed circuit board of the device, i.e. the distance between the first wall and the second wall of the printed circuit board.

In a possible implementation form of the first aspect, the second surface of the conductive component extends at an angle from the first surface of the conductive component such that an increasing gap is formed between the first wall of the printed circuit board and the conductive component, allowing the beam steering antenna structure to have as small dimensions as possible while still facilitating constructive interference between radiation beams. The high efficiency of the antenna arrays is enabled by the increasing gap which is configured as a multi-stage wide band impedance transformation structure.

In a further possible implementation form of the first aspect, the first wall comprises at least one first recess, the second wall comprises at least one second recess at least partially aligned with the first recess, and the first recess and the second recess extending perpendicular to a longitudinal extension of the groove, allowing the printed circuit board to be part of the antenna arrays and facilitating use of dual polarization radiation beams. Electromagnetic isolation between adjacent antenna elements of the antenna arrays is achieved by the first recess and the second recess, thus further improving the efficiency of the antenna arrays.

In a further possible implementation form of the first aspect, the first antenna array comprises at least one first antenna element, the first antenna element comprising a waveguide and a first signal feeding connection, the waveguide being formed by the first wall, the second wall, the connecting surface, the first surface of the conductive component, and the second surface of the conductive component, the first signal feeding connection being coupled to the first wall, providing an antenna array which is constructed mainly of other preexisting components and which requires as few additional components as possible. For example, the disclosed antenna elements require only $\lambda/20$ of extra space between the first wall and the second wall.

In a further possible implementation form of the first aspect, the dimensions of the waveguide, in a direction parallel with the connecting surface, increases from a first dimension to a second dimension, the first dimension being measured between the first wall and the second wall adjacent the connecting surface, the second dimension being measured between the first wall and the second surface of the conductive component, at an end of the second surface located farthest away from the connecting surface, facilitating an antenna array which has as small dimensions as possible and hence allows a display having as large dimensions as possible and no, or small, inactive areas.

In a further possible implementation form of the first aspect, the first wall forms at least one conductor element, the conductor element extending adjacent at least one of the first recess, the conductor element being tapered in a direction perpendicular to the connecting surface, allowing the effective size of the first antenna array to increase without affecting the external dimensions of the antenna array negatively. Wide band impedance matching of the first antenna elements is enabled by the tapered shape of the conductor elements.

In a further possible implementation form of the first aspect, the second antenna array comprises at least one second antenna element, the second antenna element comprising a second signal feeding connection, at least one conductor, and a reflector, the second signal feeding connection being connected to the conductor, the reflector being formed by a bottom edge of the first recess, the bottom edge extending in parallel with the connection surface, taking advantage of preexisting components in order to form the second antenna array. The second antenna array being integrated with the first antenna array enables dual layer polarization MIMO/diversity support of the electronic device.

In a further possible implementation form of the first aspect, the second antenna element is a dipole antenna, the dipole antenna comprising two conductors extending in parallel with the reflector. The efficiency of the first antenna array and the second antenna array is maximized since the orthogonal modes of the first waveguide antenna elements and second dipole antenna element configures high isolation between the antenna elements. Further, dipole antenna elements take advantage of the known functional properties of a previously used antenna solution.

In a further possible implementation form of the first aspect, the second antenna element is a slot antenna comprising one conductor extending in parallel with the reflector across the first recess. The second antenna element being configured as a slot antenna has high efficiency and wideband impedance matching in implementations where the device has conductive surfaces at very small distances from the antenna. Further, the tapered slot antenna enables wideband performance.

In a further possible implementation form of the first aspect, the first antenna array comprises at least two first antenna elements and the second antenna array comprises at least two second antenna elements arranged alternately along the longitudinal extension of the groove, allowing use of two separate antenna arrays within one common space. Dual-polarization beamforming and beam-scanning is enabled by coherent operation of the at least two antenna elements, thus further increasing array gain and spherical coverage.

According to a second aspect, there is provided an electronic device comprising a display, a housing, and a beam steering antenna structure according to the above, the beam steering antenna structure being enclosed at least partially by the display and the housing such that the first radiation beam and the second radiation beam, steered by the beam steering antenna structure, can radiate in a direction essentially perpendicular to the display in at least one of a direction from and towards the beam steering antenna structure past the display.

This not only allows using dual polarization but also facilitates constructive interference between the two radiation beams, leading to increased antenna performance and stable communication in all directions and orientations. The present disclosure supports high-efficiency beamforming which is not blocked by the user's hand since the display of the devices remains exposed to free-space in the majority of possible hand grips and user scenarios.

In a further possible implementation form of the second aspect, the housing is conductive, and a dielectric gap separates the display and the beam steering antenna structure from the housing, the dielectric gap at least partially comprising a dielectric material such that the steered radiation beams can pass through the dielectric gap towards or from the exterior of the electronic device. At that, the antenna structure is protected from environmental factors.

In a further possible implementation form of the second aspect, the first antenna array of the beam steering antenna structure transmits and receives a first radiation beam having a first polarization extending in a plane substantially perpendicular to the display, and the second antenna array transmits and receives a second radiation beam having a second polarization extending in a plane substantially perpendicular to the display, allowing use of dual polarization leading to increased antenna performance, enabling dual layer polarization MIMO/diversity support of the electronic device.

In a further possible implementation form of the second aspect, the conductive component of the beam steering antenna structure is at least one of a camera, a further printed circuit board, a device chassis, and a display shielding conductor, taking advantage of preexisting components and requiring no additional components. Thus, the volume occupied by the antenna structure is reduced further.

In a further possible implementation form of the second aspect, the housing comprises a metal frame and a back cover, the metal frame extending between peripheral edges of the display and the back cover, the waveguide of the beam steering antenna structure extending between the conductive component and the first wall of the printed circuit board of the beam steering antenna structure, the first wall being separated from the metal fame by the dielectric gap. The dielectric gap provides a space for the radiation beams to travel towards or from the exterior. At that, the antenna structure is protected from environmental factors. The metal frame provides mechanical strength and visually appealing design to the electronic device.

In a further possible implementation form of the second aspect, at least one conductor element of the waveguide is tapered in a direction towards the display, and the gap between the first wall of the printed circuit board of the beam steering antenna structure and the conductive component increases in the direction towards the display, allowing the effective size of the waveguide to increase without affecting the external dimensions of the antenna array negatively. Furthermore, wide band impedance matching of the waveguide antenna elements is enabled by the tapered shape of the conductor elements, configured as a multi-stage wide band impedance transformation structure.

In a further possible implementation form of the second aspect, the electronic device further comprises a third antenna array connected to the metal frame, the third antenna array being separated from the first wall of the printed circuit board of the beam steering antenna structure by means of the dielectric material, allowing antennas using other frequencies then the first and second antenna arrays.

In a further possible implementation form of the second aspect, the display is connected to the waveguide of the beam steering antenna structure, avoiding inactive areas on the display, thus effectively increasing display size.

In a further possible implementation form of the second aspect, the electronic device further comprises a reflection passage formed within the dielectric gap between the first wall and the metal frame, the reflection passage comprising at least one reflective structure arranged at a predetermined distance from the first antenna array such that radiation propagating from the beam steering antenna structure into the reflection passage is reflected back to the beam steering antenna structure by the reflective structure, decreasing the amount of radiation traveling in an undesired, and even disadvantageous, direction.

In a further possible implementation form of the second aspect, the predetermined distance is quarter wavelength ±25%, which is suitable for use with mmWave frequencies.

In a further possible implementation form of the second aspect, the reflective structure is a protrusion extending towards the first wall of the printed circuit board of the beam steering antenna structure, facilitating a reflective structure which is easy to manufacture, and which does not require additional space within the electronic device.

In a further possible implementation form of the second aspect, the reflective structure is capacitively coupled to the first wall of the printed circuit board of the beam steering antenna structure, allowing the reflective structure to be configured as efficiently as possible.

In a further possible implementation form of the second aspect, the reflective structure is aligned with the first antenna array and the second antenna array of the beam steering antenna structure, facilitating an as efficient reflection of radiation as possible.

This and other aspects will be apparent from and the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 1 shows a schematic perspective view of an electronic device according to an embodiment of the present invention;

FIG. 2a shows a partial perspective view of an electronic device in accordance with one embodiment of the present invention;

FIG. 2b shows a partial, exploded view of the embodiment of FIG. 2a wherein the dielectric material is hidden;

FIG. 3b shows a cross-sectional side view of the embodiment of FIG. 3a;

FIG. 6b shows a partial cross-sectional view of the embodiment of FIG. 6a;

FIG. 8b shows a partial perspective view of the embodiment of FIG. 8a.

DETAILED DESCRIPTION

FIG. 1 shows an electronic device 17, such as a mobile phone or a tablet, comprising a display 18 and a housing 19. The electronic device 17 transmits and/or receives two sets of radiation beams B1 and B2 by means of antenna elements. The first radiation beam B1 has a first polarization P1 and the second radiation beam B2 has a second polarization P2 orthogonal to the first polarization P1. The polarization is preferably linear, such that the first polarization P1 is horizontal or vertical and the second polarization P2 is, correspondingly, vertical or horizontal.

Figure 7A:
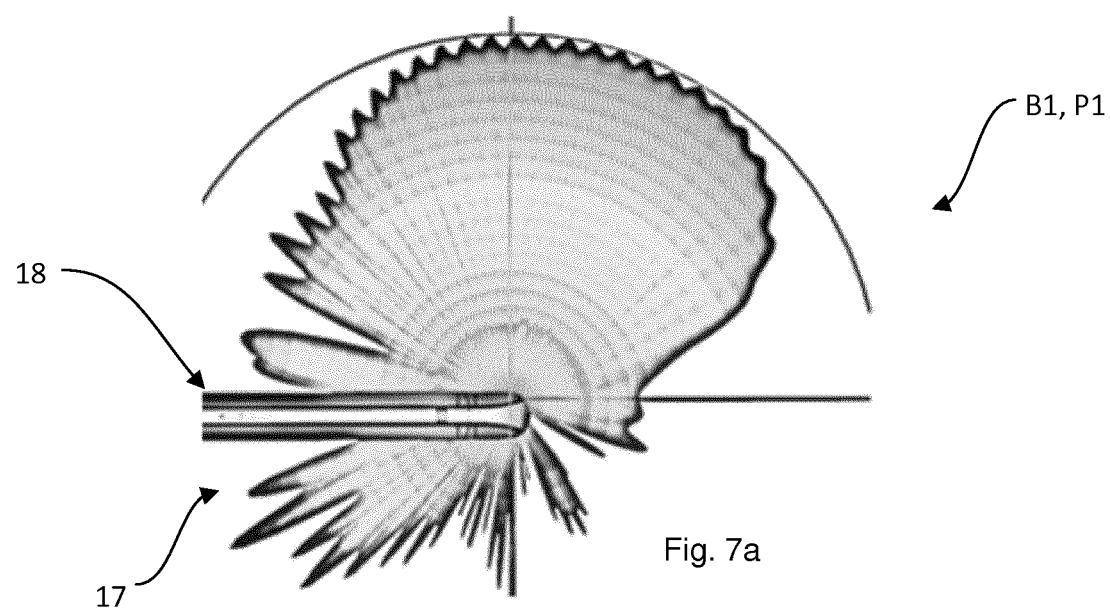
FIGS. 7a and 7b show schematic illustrations of the radiation beams and their polarizations according to an embodiment of the present invention.
Figure 7B:
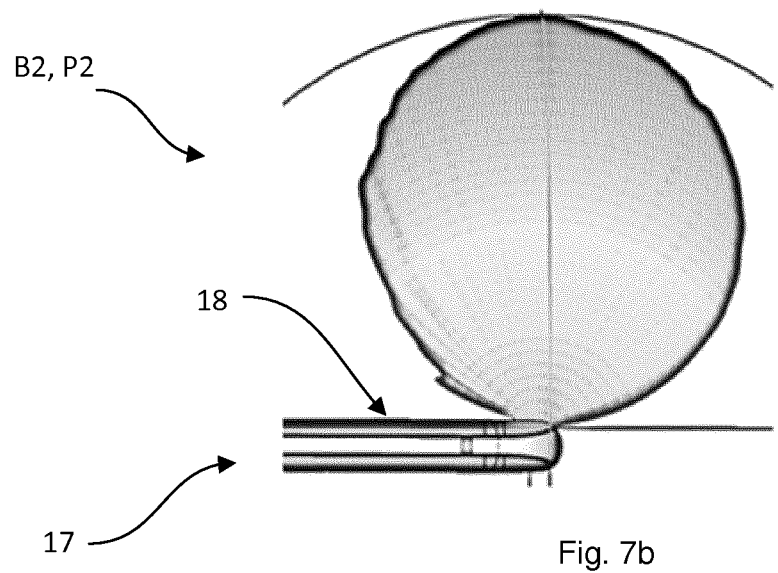

The electronic device further comprises a beam steering antenna structure 1 enclosed at least partially by the display 18 and the housing 19, the beam steering antenna structure 1 steering the first radiation beam B1 and the second radiation beam B2 in a direction essentially perpendicular to the display 18 in a direction from the beam steering antenna structure 1 and in a direction towards the beam steering antenna structure 1, past the display 18, as shown in FIGS. 7a and 7b.

Figure 6A:
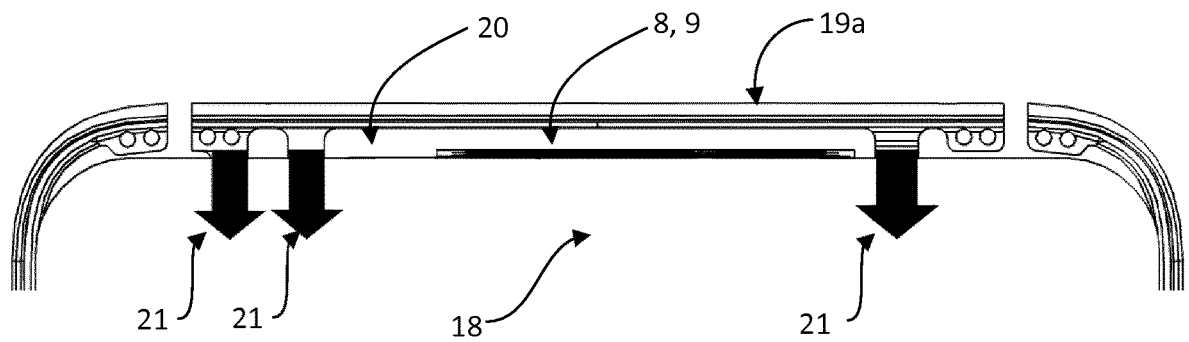
FIG. 6a shows a partial cross-sectional view of an electronic device in accordance with one embodiment of the present invention.
Figure 6B:
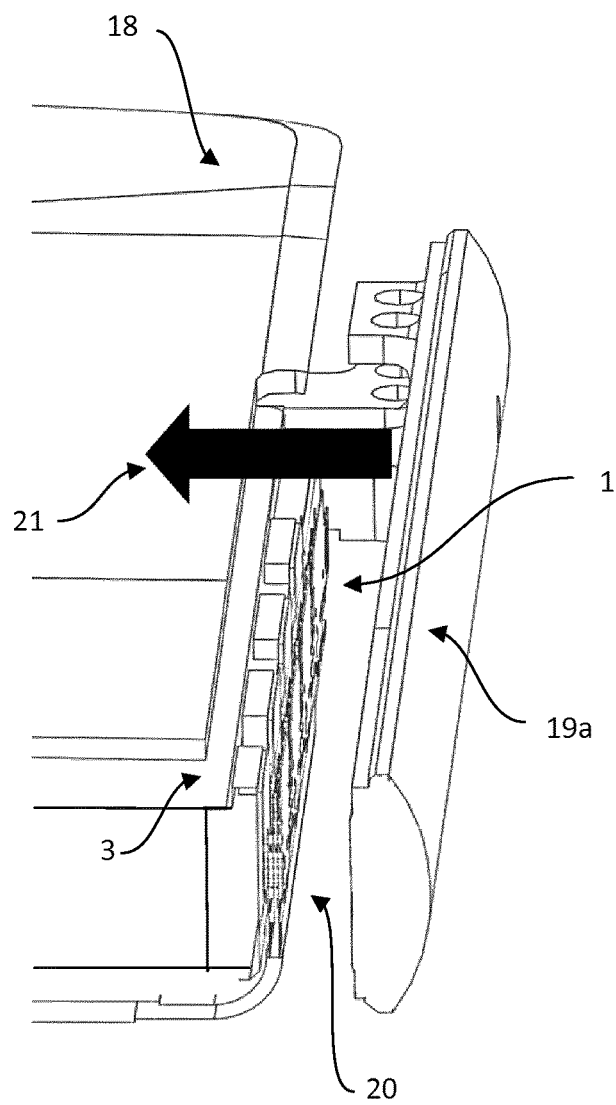

The housing 19 may be made in one integral piece, but may also comprise a metal frame 19a and a separate back cover 19b, the metal frame 19a being configured to extend between the peripheral edges of the display 18 and the back cover 19b, as shown in FIGS. 2a and 6a. In one embodiment, the housing 19 is conductive, and a dielectric gap 20 separates the display 18 and the beam steering antenna structure 1 from the housing 19, as shown in FIGS. 2a, 6a, and 6b. The dielectric gap 20 comprises, at least partially, a dielectric material.

The beam steering antenna structure 1 comprises a printed circuit board 2 and a conductive component 3, shown schematically in FIGS. 2a and 2b. The beam steering structure 1 steers at least one of the first radiation beam B1 and the second radiation beam B2, such that the two radiation beams, regardless of their different polarizations P1 and P2, are directed in the same direction. When the radiation beams B1 and B2 are directed in the same direction, the beams overlap and reinforce the transmitted and/or received signal by means of constructive interference.

The conductive component 3 is preferably at least one of a camera, a further printed circuit board, a device chassis, and a display shielding conductor.

The printed circuit board 2 comprises, i.a., a first wall 4 and a second wall 5 extending at least partially in parallel, a connecting surface 6 extending between the first wall 4 and the second wall 5 such that a groove 7 is formed between the first wall 4 and the second wall 5, the connecting surface 6 constituting the bottom surface of the groove 7. The first wall 4, second wall 5, connecting surface 6, and hence groove 7, are arranged along at least one edge of the printed circuit board 2, preferably at least along two opposite edges of the printed circuit board 2.

In one embodiment, the printed circuit board 2 is made of flexible substrate materials, for example polyimide, polyethylene, and/or liquid crystal polymers. Furthermore, the printed circuit board 2 may be conformally shaped around other components of the device, as shown in FIGS. 2a, 2b, 8a, and 8b. For example, the printed circuit board 2 may be a hybrid rigid-flex printed circuit board enabling conformal installation around internal components of the device and surface-mount assembly of the circuit components such as RFIC and connectors.

Figure 3A:
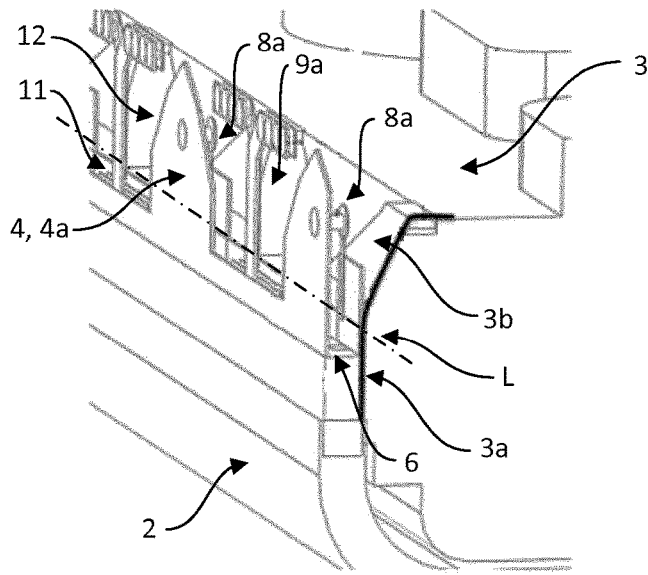
FIG. 3a shows a partial perspective view of a beam steering antenna structure according to an embodiment of the present invention.
Figure 3B:
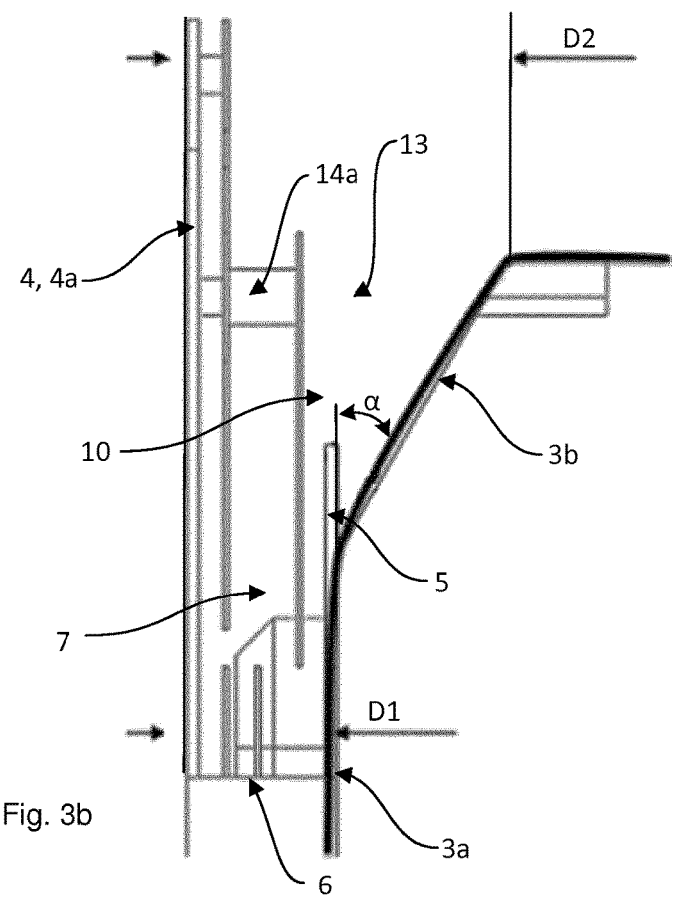

The first wall 4 and the second wall 5 of the printed circuit board 2 are arranged such that they are juxtaposed with a first surface 3a of the conductive component 3, preferably the first wall 4 and the second wall 5 of the printed circuit board 2 extend in parallel with the first surface 3a of the conductive component 3. The second wall 5 of the printed circuit board 2 abuts, and is galvanically connected to, the first surface 3a of the conductive component 3, as shown in FIGS. 3a and 3b. A second surface 3b of the conductive component 3 extends at an angle α from the first surface 3a of the conductive component 3 in a direction from the first wall 4. A gap 10 is formed between the first wall 4 of the printed circuit board 2 and the first surface 3a and the second surface 3b of the conductive component 3. The gap 10 increases in size, from a first dimension D1 to a second dimension D2, in a direction away from the connecting surface 6 and towards the display 18. The first dimension D1 is measured between the first wall 4 and the second wall 5 adjacent the connecting surface 6, and the second dimension D2 is measured between the first wall 4 and the second surface 3b of the conductive component 3, at an end of the second surface 3b located farthest away from the connecting surface 6, as shown in FIGS. 3b and 6a.

The groove 7, formed between the first wall 4 and the second wall 5, is also at least partially juxtaposed to the first surface 3a, preferably also to the second surface 3b though not extending in parallel with the angled, second surface 3b. The groove 7 comprises a first antenna array 8 and a second antenna array 9, each antenna array 8, 9 comprising at least one antenna element 8a, 9a.

The first antenna array 8 transmits the first radiation beam B1 having the first polarization P1 in a direction towards the second surface 3b, or receives the first radiation beam B1 in a direction from the second surface 3b. The second antenna array 9 transmits the second radiation beam B2 having the second polarization P2, orthogonal to the first polarization P1, in the direction towards the second surface 3b, or receives the second radiation beam B2 in the direction from the second surface 3b. The second surface 3b steers at least one of the first radiation beam B1 and the second radiation beam B2 in a direction away from, or towards, the connecting surface 6. The first polarization P1 extends in a plane substantially perpendicular to the display 18, and the second polarization P2 extends in a plane substantially perpendicular to the display 18.

Figure 4A:
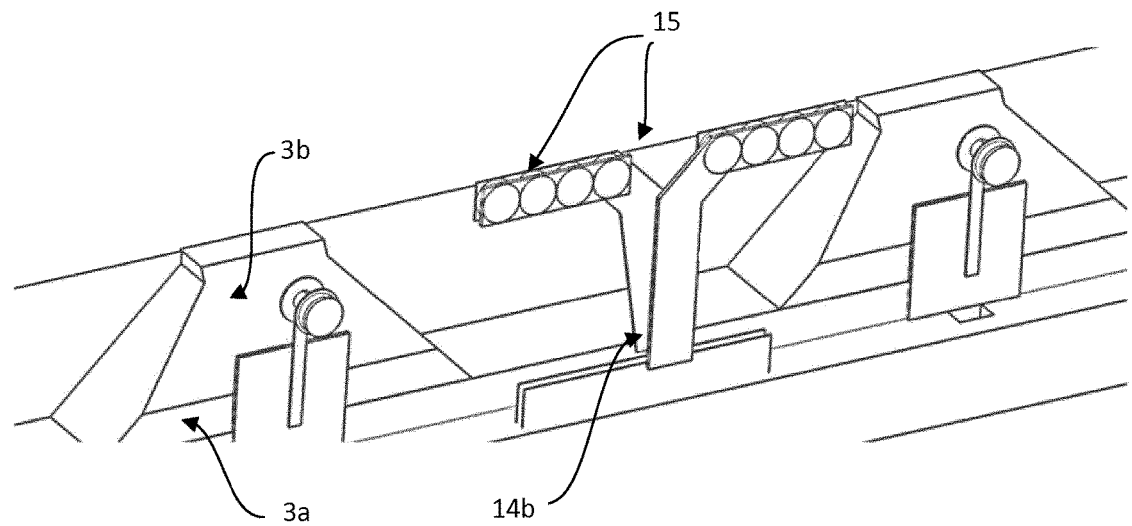
FIG. 4a shows a partial perspective view of the beam steering antenna structure of FIGS. 3a and 3b.
Figure 4B:
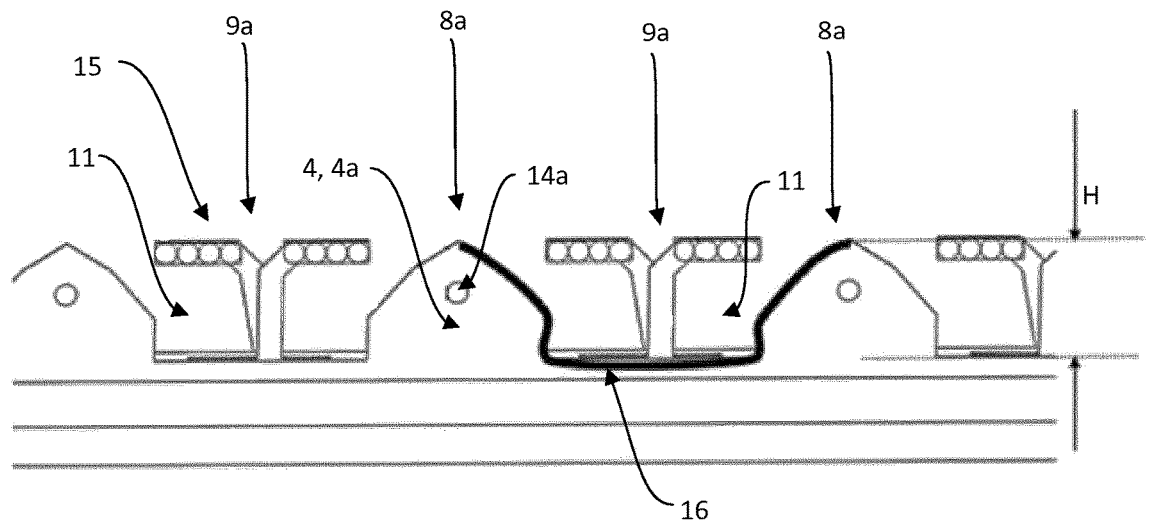
FIG. 4b shows a cross-sectional side view of the embodiment of FIGS. 3a and 3b.

The first wall 4 comprises at least one first recess 11, and the second wall 5 comprises at least one second recess 12 at least partially aligned with the first recess 11, as shown in FIGS. 3a and 4b. The first recess 11 and the second recess 12 extend perpendicular to the longitudinal extension L of the groove 7.

The first antenna array 8 comprises at least one first antenna element 8a and the second antenna array 9 comprises at least one second antenna element 9a. In one embodiment, the first antenna array 8 comprises at least two first antenna elements 8a and the second antenna array 9 comprises at least two second antenna elements 9a arranged alternately along the longitudinal extension L of the groove 7, as shown in FIGS. 2b, 3a, and 4b.

The first antenna element 8a comprises a waveguide 13 and a first signal feeding connection 14a, as shown in FIG. 3b. The waveguide 13 is formed by the first wall 4, the second wall 5, the connecting surface 6, the first surface 3a of the conductive component 3, and the second surface 3b of the conductive component 3, i.e. the waveguide 13 extends between the conductive component 3 and the first wall 4. The first signal feeding connection 14a is coupled to the first wall 4 via a galvanic connection or a capacitive coupling structure.

In one embodiment, the display 18 is connected to the waveguide 13 via the conductive component 3.

The dimensions of the waveguide 13 increases, corresponding to the increase in dimensions of the gap 10, when measured in a direction parallel with the connecting surface 6, from a first dimension D1 to a second dimension D2. The first dimension D1 is measured between the first wall 4 and the second wall 5 adjacent the connecting surface 6. The second dimension D2 is measured between the first wall 4 and the second surface 3b of the conductive component 3, at an end of the second surface 3b located farthest away from the connecting surface 6. The effective size of the waveguide 13, in other words, is increased beyond the first dimension D1, which, in one embodiment, is less than $\lambda/20$, as the waveguide 13 expands along the second surface 3 of the conductive component 3.

The first wall 4 of the waveguide 13 forms at least one conductor element 4a, the conductor element 4a extending adjacent at least one first recess 11, preferably between two first recesses 11. The conductor element 4a is tapered in a direction perpendicular to the connecting surface 6, in a direction towards the display 18. The height H of the conductor element 4a in the direction towards the display 18, shown in FIG. 4b, may be $\lambda/2$ or $\lambda/4$.

The tapered sides and the height H of the conductor element 4a, the first surface 3a and the second surface 3b of the conductive component 3 provide waveguide impedance transformation of the first antenna element 8a at sufficient bandwidth.

The second antenna element 9a comprises a second signal feeding connection 14b, at least one conductor 15, and a reflector 16. The second signal feeding connection 14b is connected to the conductor 15, and the reflector 16 is formed by the bottom edge of the first recess 11, i.e. the bottom edge extends in parallel with the connection surface 6 as shown in FIGS. 4b and 5b.

The first recess 11, the second recess 12, and the second surface 3b of the conductive component 3 form a cavity against the second antenna element 9a. The clearance towards the metal surfaces provides sufficient bandwidth of the second antenna element 9a.

In one embodiment, shown in FIGS. 4a and 4b, the second antenna element 9a is a dipole antenna. The dipole antenna comprises two conductors 15 extending in parallel with the reflector 16. The first wall (4) is hidden in FIG. 4a for the sake of clarity.

The first branch of the conductor 15 is configured as a stripline extending perpendicular to the longitudinal extension L of the groove 7, see FIG. 3a, at the second signal feeding connection 14b. In order to allow the first branch of the conductor 15 to extend in parallel with the reflector 16, the conductor 15 is bent such that it extends parallel with the longitudinal extension L. The second branch of the conductor 15 is shaped symmetrically with the first branch and is connected to the reflector 16 in a tapered transition segment.

Figure 5A:
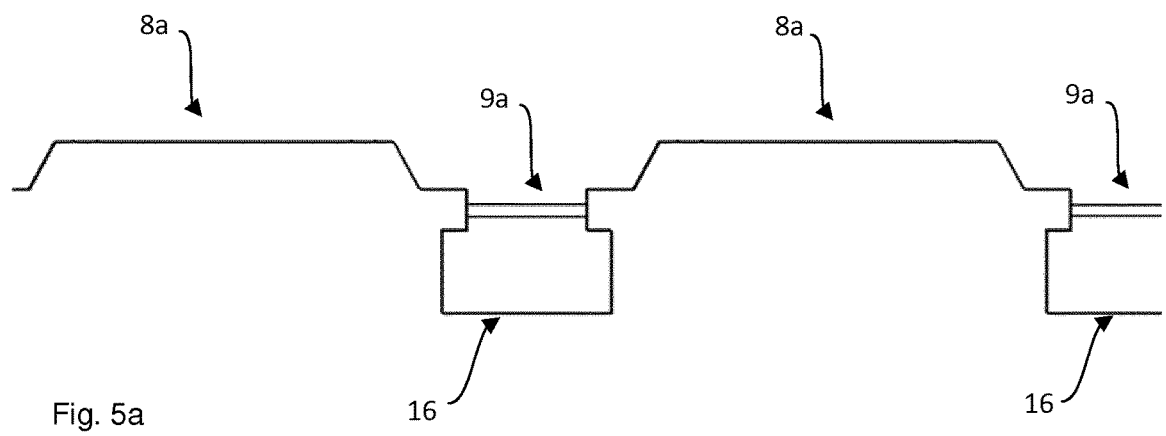
FIGS. 5a and 5b show partial cross-sectional side views of a beam steering antenna structure according to a further embodiment of the present invention.
Figure 5B:
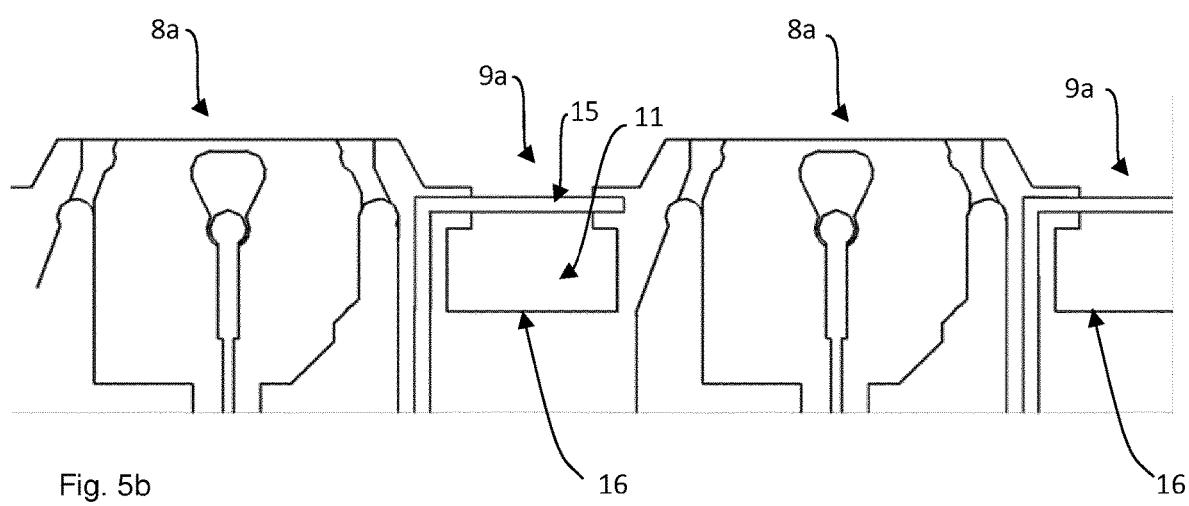

In a further embodiment, shown in FIGS. 5a and 5b, the second antenna element 9a is a slot antenna comprising one conductor 15 extending in parallel with the reflector 16, across the first recess 11.

The electronic device 17 may further comprise a third antenna array configured by the metal frame 19a of the housing 19 and a number of connection points 21 arranged between the internal structures of the device and the metal frame 19a. The metal frame 19a is separated from the first wall 4 of the printed circuit board 2 of the beam steering antenna structure 1 by the dielectric material arranged in the dielectric gap 20. The connection points 21 are configured in conductive or capacitive manner across the dielectric gap 20. The third antenna array 21 may be a sub-6 GHz antenna.

Figure 8A:
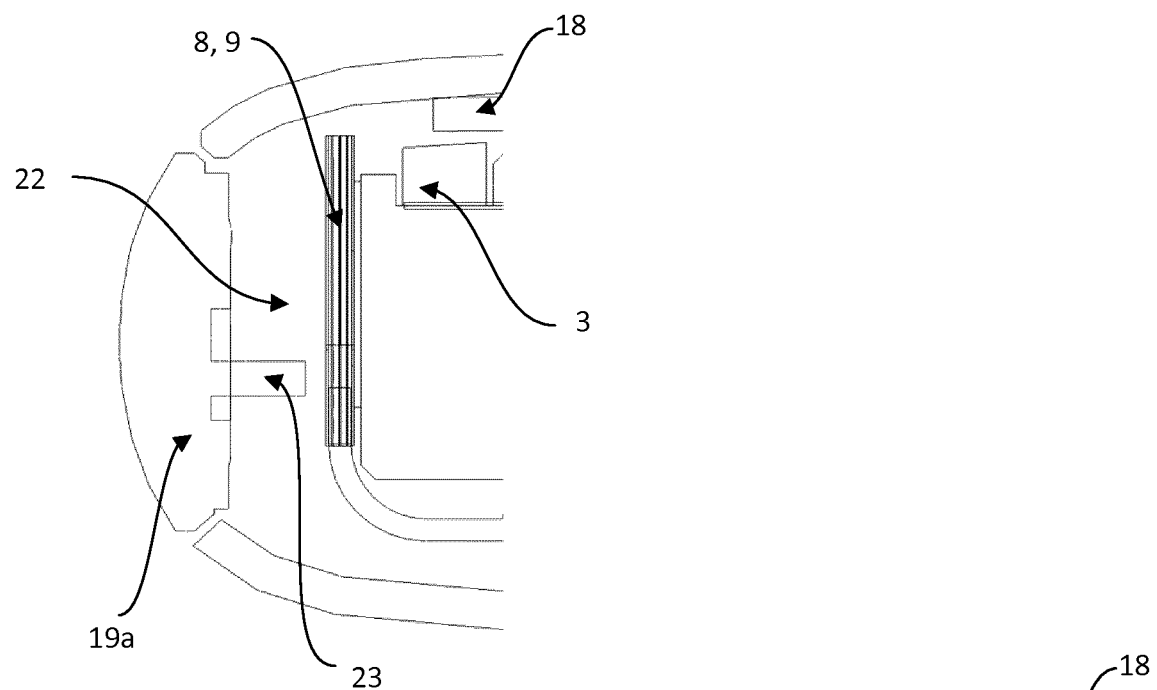
FIG. 8a shows a partial, cross-sectional side view of an electronic device according to an embodiment of the present invention.
Figure 8B:
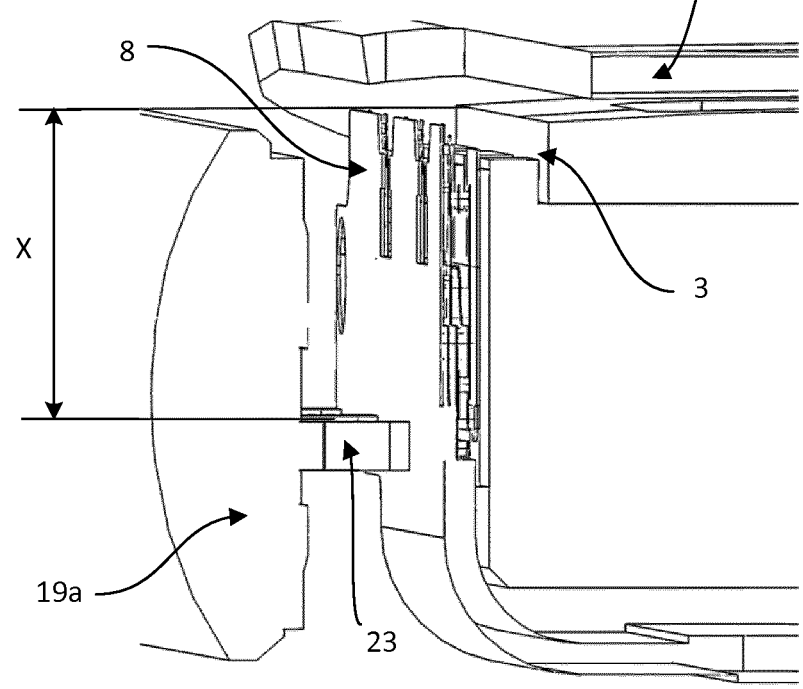

As shown in FIGS. 8a and 8b, the electronic device may further comprise a reflection passage 22 formed within the dielectric gap 20 between the first wall 4 and the metal frame 19a. The reflection passage comprises at least one reflective structure 23 arranged at a predetermined distance X from the first antenna array 8, which allows radiation propagating from the beam steering antenna structure 1 into the reflection passage 22 to be reflected back to the beam steering antenna structure 1 by the reflective structure 23. In one embodiment, the predetermined distance X is quarter wavelength $\lambda/4 \pm 25\%$.

The reflective structure 23 may be a protrusion extending towards the first wall 4 of the printed circuit board 2 of the beam steering antenna structure 1, but is not galvanically coupled to the beam steering antenna structure 1. The reflective structure 23 may be capacitively coupled to the first wall 4 of the printed circuit board 2 of the beam steering antenna structure 1. In one embodiment, the reflective structure 23 is aligned with the first antenna array 8 and the second antenna array 9 of the beam steering antenna structure 1.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. A beam steering antenna structure comprising:
   a conductive component comprising:
      a first surface; and
      a second surface; and
   a printed circuit board comprising:
      a first wall juxtaposed with the first surface;
      a second wall abutting and galvanically connected to the first surface;
   a connecting surface located between the first wall and the second wall to form a groove between the first wall and the second wall, wherein the groove is partially juxtaposed with the first surface;
   a first antenna array disposed in the groove and configured to:
      transmit a first radiation beam having a first polarization in a first direction towards the second surface; or
      receive the first radiation beam in a second direction from the second surface; and
   a second antenna array disposed in the groove and configured to:
      transmit a second radiation beam having a second polarization in the first direction, wherein the second polarization is orthogonal to the first polarization; or
      receive the second radiation beam in the second direction, and
   wherein the second surface extends at an angle ($\alpha$) from the first surface in a third direction from the first wall and is configured to steer at least one of the first radiation beam or the second radiation beam in a fourth direction away from or towards the connecting surface.

2. The beam steering antenna structure of claim 1, wherein the second surface forms an increasing gap between the first wall the conductive component.

3. The beam steering antenna structure of claim 1, wherein the first wall comprises a first recess, wherein the second wall comprises a second recess partially aligned with the first recess, and wherein the first recess and the second recess extend perpendicular to a longitudinal extension of the groove.

4. The beam steering antenna structure of claim 3, wherein the first wall forms a conductor element extending adjacent to the first recess, and wherein the conductor element is tapered in a direction perpendicular to the connecting surface.

5. The beam steering antenna structure of claim 3, wherein the second antenna array comprises a second antenna element, and wherein the second antenna element comprises:
   a conductor;
   a second signal feeding connection coupled to the conductor; and
   a reflector formed using a bottom edge of the first recess that extends in parallel with the connection surface.

6. The beam steering antenna structure of claim 5, wherein the second antenna element is a dipole antenna comprising two conductors extending in parallel with the reflector.

7. The beam steering antenna structure of claim 5, wherein the second antenna element is a slot antenna comprising one conductor extending in parallel with the reflector across the first recess.

8. The beam steering antenna structure of claim 3, wherein the first antenna array comprises at least two first antenna elements, and wherein the second antenna array comprises at least two second antenna elements, and wherein the at least two first antenna elements and the at least two second antenna elements are arranged alternately along the longitudinal extension.

9. The beam steering antenna structure of claim 1, wherein the first antenna array comprises a first antenna element, and wherein the first antenna element comprises:
   a waveguide formed using the first wall, the second wall, the connecting surface, the first surface, and the second surface; and
   a first signal feeding connection coupled to the first wall.

10. The beam steering antenna structure of claim 9, wherein a dimension of the waveguide in a direction parallel to the connecting surface increases from a first dimension to a second dimension, wherein the first dimension is measured between the first wall and the second wall adjacent to the connecting surface, and wherein the second dimension is measured between the first wall and the second surface at an end of the second surface located farthest away from the connecting surface.

11. An electronic device comprising:
a display;
a housing; and
a beam steering antenna structure enclosed by the display and the housing and comprising:
  a conductive component comprising:
    a first surface; and
    a second surface; and
  a printed circuit board comprising:
    a first wall juxtaposed with the first surface;
    a second wall abutting and galvanically connected to the first surface;
    a connecting surface located between the first wall and the second wall to form a groove between the first wall and the second wall, wherein the groove is partially juxtaposed with the first surface;
    a first antenna array disposed in the groove and configured to:
      transmit a first radiation beam having a first polarization in a first direction towards the second surface; or
      receive the first radiation beam in a second direction from the second surface; and
    a second antenna array disposed in the groove and configured to:
      transmit a second radiation beam having a second polarization in the first direction, wherein the second polarization is orthogonal to the first polarization; or
      receive the second radiation beam in the second direction,
    wherein the second surface extends at an angle ($\alpha$) from the first surface in a third direction from the first wall and is configured to steer at least one of the first radiation beam or the second radiation beam in a fourth direction away from or towards the connecting surface, and
  wherein, the beam steering antenna structure is configured to steer the first radiation beam and the second radiation beam to radiate in a fifth direction perpendicular to the display in at least one of a sixth direction from or towards the beam steering antenna structure and past the display.

12. The electronic device of claim 11, wherein the housing is conductive, wherein the electronic device further comprises a dielectric gap separating the display and the beam steering antenna structure from the housing, and wherein the dielectric gap comprises a dielectric material.

13. The electronic device of claim 12, wherein the housing comprises:
  a back cover; and
  a metal frame located between peripheral edges of the display and the back cover,
  wherein the beam steering antenna structure further comprises a waveguide located between the conductive component and the first wall, and
  wherein the first wall is separated from the metal frame using the dielectric gap.

14. The electronic device of claim 13, wherein the waveguide comprises a conductor element tapering in a seventh direction towards the display, wherein the beam steering antenna structure further comprises a gap formed between the first wall and the conductive component increases in the seventh direction.

15. The electronic device of claim 13, further comprising a third antenna array connected to the metal frame, wherein the third antenna array is separated from the first wall using the dielectric material.

16. The electronic device of claim 13, wherein the display is connected to the waveguide.

17. The electronic device of claim 13, further comprising a reflection passage formed within the dielectric gap and between the first wall and the metal frame, wherein the reflection passage comprises a reflective structure arranged at a predetermined distance from the first antenna array, and wherein the reflective structure is configured to reflect a radiation propagated from the beam steering antenna structure into the reflection passage back to the beam steering antenna structure.

18. The electronic device of claim 17, wherein the predetermined distance is a quarter wavelength ($\lambda/4$)±25 percent (%).

19. The electronic device of claim 11, wherein the first antenna array is further configured to transmit and receive the first radiation beam extending in a plane substantially perpendicular to the display, and wherein the second antenna array is further configured to transmit and receive the second radiation beam.

20. The electronic device claim 11, wherein the conductive component is at least one of a camera, a further printed circuit board, a device chassis, or a display shielding conductor.

* * * * *

UNITED STATES PATENT AND TRADEMARK OFFICE
CERTIFICATE OF CORRECTION

| | | |
|---|---|---|
| PATENT NO. | : 11,996,629 B2 | |
| APPLICATION NO. | : 17/298397 | |
| DATED | : May 28, 2024 | |
| INVENTOR(S) | : Alexander Khripkov et al. | |

It is certified that error appears in the above-identified patent and that said Letters Patent is hereby corrected as shown below:

In the Claims

Claim 19, Column 12, Line 45: "radiation beam." should read "radiation beam extending in the plane."

Signed and Sealed this
Ninth Day of July, 2024

Katherine Kelly Vidal
*Director of the United States Patent and Trademark Office*